Feb. 3, 1970  W. G. PONTIS  3,492,867
FLUID METERING DEVICE
Original Filed Sept. 12, 1966  7 Sheets-Sheet 1

INVENTOR.
WILLIAM GRANT PONTIS
BY
ATTORNEYS

Feb. 3, 1970   W. G. PONTIS   3,492,867
FLUID METERING DEVICE
Original Filed Sept. 12, 1966   7 Sheets-Sheet 2

INVENTOR.
WILLIAM GRANT PONTIS

BY
*Toulmin & Toulmin*

ATTORNEYS

Feb. 3, 1970 W. G. PONTIS 3,492,867
FLUID METERING DEVICE

Original Filed Sept. 12, 1966 7 Sheets-Sheet 5

INVENTOR.
WILLIAM GRANT PONTIS
BY
ATTORNEYS

Feb. 3, 1970  W. G. PONTIS  3,492,867
FLUID METERING DEVICE
Original Filed Sept. 12, 1966  7 Sheets-Sheet 5

INVENTOR.
WILLIAM GRANT PONTIS
BY
Toulmin & Toulmin
ATTORNEYS

Feb. 3, 1970 W. G. PONTIS 3,492,867
FLUID METERING DEVICE
Original Filed Sept. 12, 1966 7 Sheets-Sheet 6

INVENTOR.
WILLIAM GRANT PONTIS
BY Toulmin & Toulmin
ATTORNEYS

INVENTOR.
WILLIAM GRANT PONTIS
BY
ATTORNEYS

3,492,867
FLUID METERING DEVICE
William Grant Pontis, Waverly, Ohio, assignor to William Grant Pontis and Paul R. Pontis, Springfield, Ohio, a joint venture
Continuation of application Ser. No. 587,354, Sept. 12, 1966. This application Mar. 14, 1968, Ser. No. 713,260
Int. Cl. G01f 3/08
U.S. Cl. 73—260                    15 Claims

ABSTRACT OF THE DISCLOSURE

This disclosure relates to fluid flow meters of the vane-type which are actuated by the flowing fluid through the meter and one wherein improved fluid and vane action and sealing construction produces a more inexpensive, more accurate and extremely sensitive fluid meter.

---

This is a continuation of application Ser. No. 587,354 filed Sept. 12, 1966 and now abandoned.

This invention relates to fluid operated devices actuated by the flowing fluid and, more particularly, to vane-type fluid flow meters for measuring the fluid flow in which the flowing fluid actuates the vanes.

Fluid flow meters are, of course, known and are employed under varying conditions for measuring quantities of liquids and gases flowing through a conduit. The meter is connected into the fluid system so that the fluid flows through and out of the meter for measurement of the fluid.

Such meters are employed, for example, in domestic establishments in the incoming gas and water lines and find a wide variety of uses commercially as in connection with fuel dispensing pumps and the like and in industry.

One problem with some fluid flow meters is that the fluid flow through the meter follows a tortuous turbulent path, which introduces vibration and head losses in the fluid system. Other present meters utilize complex and expensive valving mechanisms to measure the fluid flow; this creates the problem of high cost plus more servicing and maintenance. A problem with some meters is that they are heavy, complicated, and expensive. It should be understood that the term "fluid" includes not only gaseous mediums but also liquid mediums.

In certain types of meters, the complexity of the mechanism creates high frictional drag. This not only causes a substantial loss of head on the fluid passing through the meter, but it also results in the metering device giving noticeably faulty readings at reduced rates of fluid flow. Thus, this type of construction materially restricts the field of application of the metering device.

A problem with some metering devices is that there is violent action betwen the mechanical parts when fluid flows therethrough. This not only creates noise and vibration but also results in undesirable wear of parts of the meter.

The present invention satisfactorily solves the foregoing problems by providing a fluid flow meter having a very simple mechanism with a smooth, non-turbulent action within a measuring area that is a uniform cross-section portion of the flow passageway. The fluid metering device of the present invention also eliminates the foregoing problems by accurately measuring both small quantities of flow and large volumes of flow to permit wide utilization of the metering device.

An object of this invention is the provision of a fluid flow meter characterized in that the fluid flowing therethrough undergoes a minimum loss in head, and wherein there is a minimum of turbulence created in the fluid flow through the metering device on account of sharp directional changes in the direction of fluid flow.

Another object of this invention is the provision of a fluid metering device of the vane-type in which sliding vanes are eliminated and improved sealing characteristics about the vanes are obtained.

A further object of this invention is the provision of a fluid meter which, while being highly efficient, is much more inexpensive to construct than known fluid meters and is simple and more inexpensive to service.

A still further object of this invention is the provision of a fluid flow meter which is sensitive to extremely small rates of fluid flow therethrough while remaining operable at greatly increased rates of fluid flow so that accurate measurements of fluid flow can be had from substantially zero rates of fluid flow up to the maximum capacity of the individual metering device.

Still another object of this invention is the provision of a fluid metering device which can be constructed in a relatively few sizes and, on account of the inherent efficiency of each metering device by means of which it will accurately measure a wide range of fluid flow rates, provide for substantially complete coverage of all normal conditions under which fluid flow rates are to be measured.

Yet another object of this invention is the provision of a fluid flow meter so constructed and arranged that the metering device in itself forms a complete operative unit that can be placed within a housing; or, can be used without a housing; or, for example, may be placed in a suitable location provided therefor in another machine or device.

It is a still further object of this invention to provide a fluid metering device which is sufficiently inexpensive that in smaller sizes it can be discarded in the event of failure thereby eliminating a great deal of expensive servicing that is customary with fluid metering devices.

An additional object of this invention is to provide a "straight-line" non-turbulent fluid flow of the fluid being measured by having the measuring chamber of the cylinder, and the outside diameter-wall of the measuring vane-carrying rotor within the cylinder (including the fully retracted measuring vanes), and the face of a stationary actuator adjacent to the measuring chamber, all being concentric with the axis of the rotor.

Another object is to provide a fluid meter having a transmission which will transmit power through a sealed partition to an indicating device and farther to provide means to reduce the speed between driving means and the transmission.

A still further object of this invention is to provide a vane-type fluid flow meter in which the vanes are positively hydro-motivated into full extension.

A still additional object of this invention is to provide a vane-type fluid flow meter having a fluid relief system for free retraction of the measuring vanes.

Another object of this invention is to provide a means of fluid forced extending of the measuring vane from a fully retracted position to its fully extended position within the measuring chamber.

Other objects, uses, and advantages of this invention are apparent upon a reading of this description, which proceeds with reference to the drawings forming part thereof and wherein.

Figure 1:
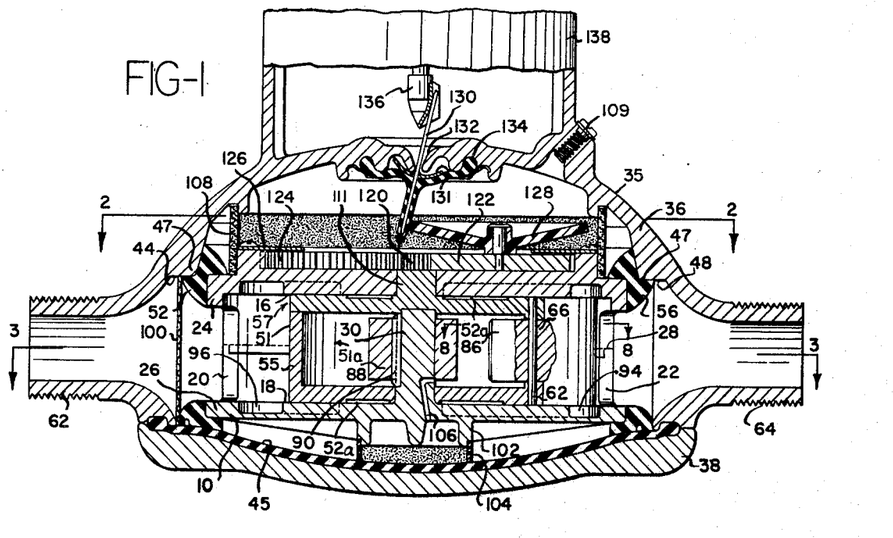
FIGURE 1 is a vertical sectional view, indicated by line 1—1, on FIGURE 2, showing one embodiment of a fluid metering device according to the present invention.
Figure 2:
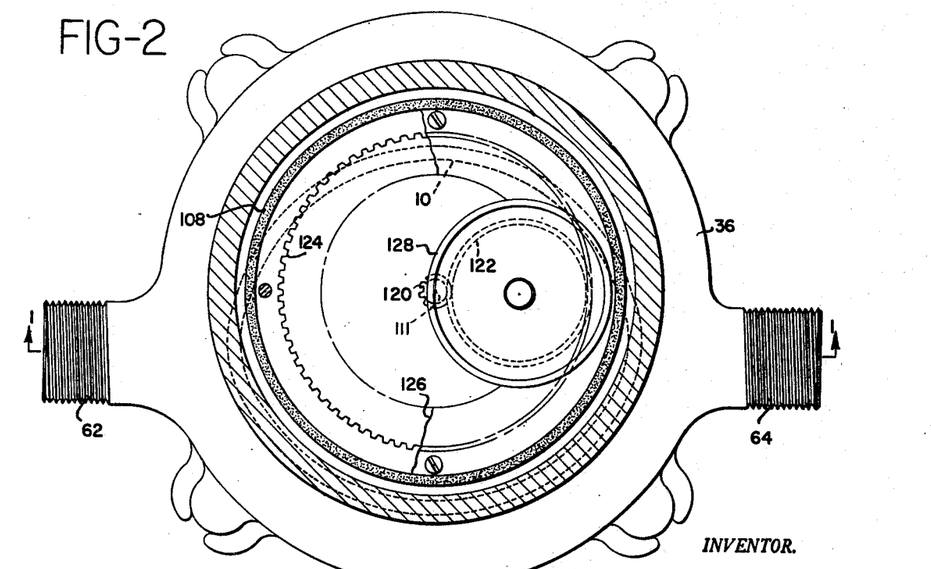
FIGURE 2 is a plan sectional view, indicated by line 2—2 on FIGURE 1, showing a part of the transmission which connects the fluid driven portion of the metering device with the register mechanism of the meter.
Figure 3:
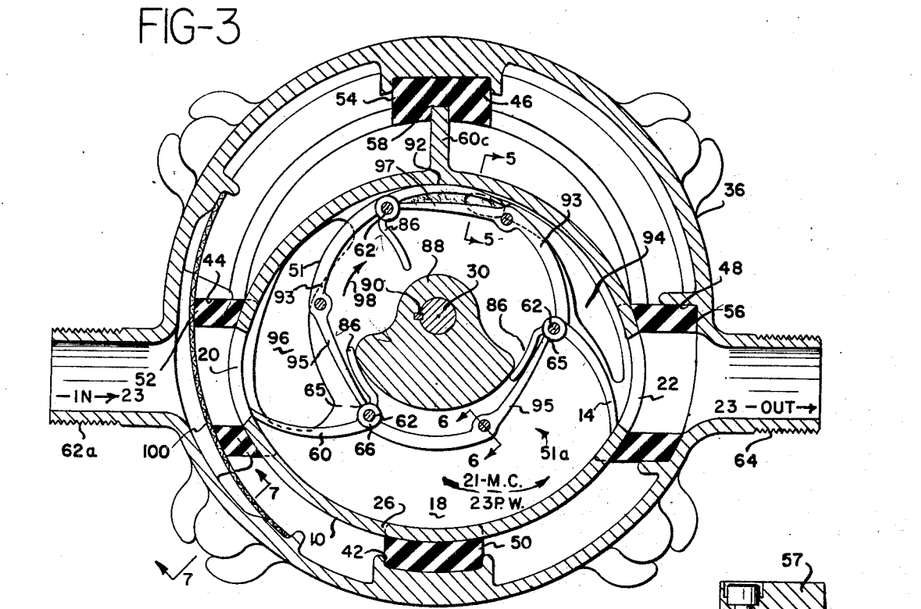
FIGURE 3 is a plan sectional view, indicated by line 3—3 on FIGURE 1, taken through the fluid driven portion of the metering device showing the measuring chamber, the vanes, and the actuator for the vanes.
Figures 4, 5, 6, 7:
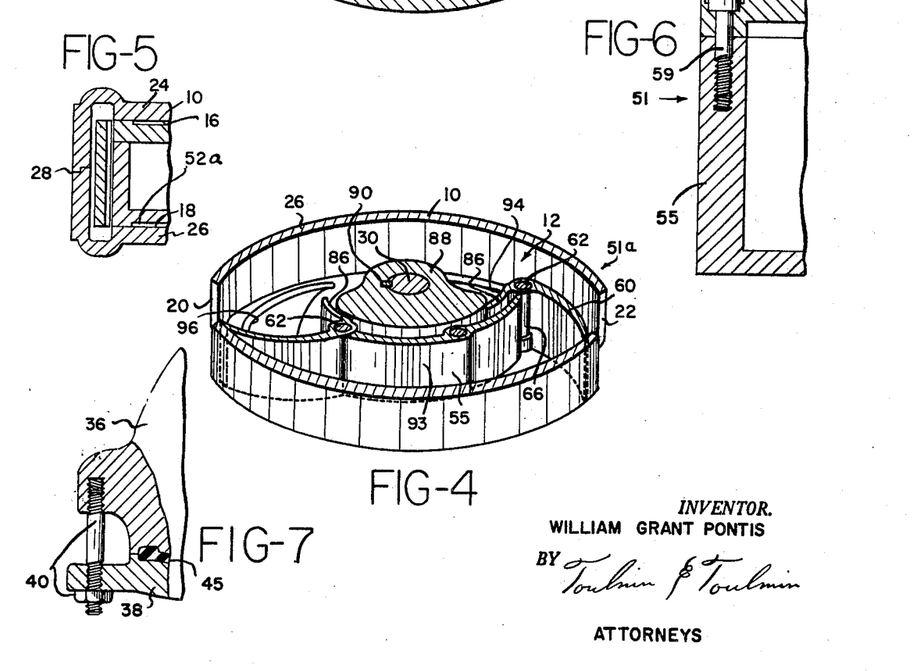
FIGURE 4 is a sectional perspective view showing the measuring chamber, the vanes, and the vane actuator and a portion of the rotor shell.
FIGURE 5 is a sectional view taken along line 5—5 of FIGURE 3.
FIGURE 6 is a vertical sectional view, indicated by line 6—6 on FIGURE 3, showing one manner of constructing the rotor of the fluid metering device.
FIGURE 7 is a fragmentary sectional view, indicated by line 7—7 on FIGURE 3, showing the manner in which the two parts of the housing of the metering device of FIGURE 1 can be connected together.

Referring to the drawings and particularly FIGURES 1 to 3, there is shown a fluid meter of the present invention including an irregular cylinder 10, which is formed by an upper portion 24 and a lower portion 26 having inter-fitting engagement with each other by a rabbet point 28 (see FIGURE 5). The upper portion 24 of the irregular cylinder 10 has its top wall 16 formed as part of the upper portion 24 and the lower portion 26 has its bottom wall 18 formed as a part of the lower portion 26.

The irregular cylinder 10, has its side wall shaped for cooperation with a rotor assembly 51a, which is rotatively mounted within the cylinder 10. The rotor assembly is rotatively mounted on a shaft 30, which extends upwardly from the bottom wall 18 of the irregular cylinder 10 and is preferably formed integral with the bottom portion 26.

Figure 8:
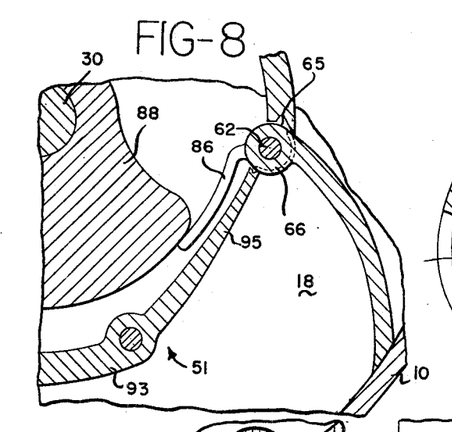
FIGURE 8 is a sectional view, indicated by line 8—8 on FIGURE 1, showing the manner in which a seal is established around one of the hubs of the swingable vanes.

The identification number 51a, throughout this description, refers to the rotor assembly including the top and bottom members of the rotor shell 51, the complete inner and outer vanes 60 and the vane pivot pins 62 (see FIGURE 3), while number 51 refers to the complete top and bottom rotor shell only (see FIGURE 8).

The rotor assembly 51a has a plurality of combined inner and outer vanes 60 pivotally connected therewith for cooperation with the inside of the irregular cylinder 10 to divide it into chambers. Each of the total vanes 60 has an outer portion 14 which is exterior of the rotor shell 51, disposed in sealing engagement with the top wall 16, the bottom wall 18, and the interior of the side wall of the irregular cylinder 10.

The irregular cylinder 10 has an inlet port 20 and an outlet port 22 to permit fluid to enter and leave the irregular cylinder 10.

The fluid passageway 23 (see FIGURES 30 and 31), is the entire passage area extending from the beginning of the fluid inlet 304 to the end of fluid outlet 307 where the measured fluid leaves through 307 and is bounded by the inside wall of housing 303, bottom closure 38 as shown in FIGURE 1, the wall of cylinder 302, the inward rolling baffle 305, the cylinder top wall 308, the cylinder bottom wall 310, and the outside perimeter of the moving rotor assembly 51a.

The measuring chamber 21 is a portion of the fluid passageway 23 which, as shown in FIGURE 3, is between the moving measuring vane 14 shown leaving the measuring chamber at the beginning of outlet port 22, and the following measuring portion 14 of a complete vane 60 shown entering the measuring chamber at the end of the inlet port 20, whereby the amount of fluid passing through the meter can readily be determined by measuring the number of turns of the rotor.

In this measuring chamber 21, the side wall of the irregular cylinder is concentric with the axis of rotation of the rotor assembly 51a to produce a "straight line" fluid flow from the inlet port to the outlet port. The cylinder top wall 16 and bottom wall 18 of FIGURE 1 form cylinder 10. The cylinder with its enclosed rotor assembly 51a including the actuator 88 of FIGURE 3, may or may not be mounted within an outer casing 35, or in any other recess that may be provided for the measuring device of the present invention.

A group of the completely assembled measuring devices may be mounted, as a part of a multiple metering system, within a single housing.

As shown in FIGURES 1 and 3, the measuring device is supported within a complete housing or casing 35. The housing or casing 35 includes an upper portion 36 and a lower cover member 38, which is secured to the upper portion 36 by a stud and nut arrangement 40 (see FIGURE 7).

The casing 35 has recesses 42, 44, 46 and 48 circumferentially spaced about its inner wall. Resilient blocks 50, 52, 54, and 56, which may be of rubber or rubbber-like material, for example, are disposed in the recesses 42, 44, 46, and 48 respectively. The resilient blocks 50, 52, 54, and 56 yieldingly engage the outer periphery of the irregular cylinder 10 at spaced points thereon to support and locate the measuring device of the present invention within the casing 35.

In order to properly locate the measuring device angularly within the casing 35, the block 54 has a recess 58 (see FIGURE 3) formed therein for reception of a measuring chamber torque arm key 60c which extends from the outside or exterior of the side wall of the irregular cylinder 10. This insures that the cylinder 10 is properly positioned within the casing 35.

As shown in FIGURES 1 and 3, the resilient blocks 52 and 56 are located in the vicinity of the inlet port 20 and the outlet port 22, respectively. The block 52 has a central bore extending therethrough to permit communication from the inlet port 20 to a threaded inlet conduit 62a in the casing 35. The block 56 has a central bore extending therethrough to permit communication from the outlet port 22 to a threaded outlet conduit 64 in the complete casing 35. Thus, the resilient blocks 52 and 56 not only support the irregular cylinder 10 within the casing 35 but also direct fluid to the inlet port 20 and from the outlet port 22 and seal about the ports 20 and 22.

By mounting the fluid metering device within the complete casing 35 through the resilient supporting blocks 50, 52, 54, and 56, the upper casing part 36 and the lower cover member 38 of the casing 35 can be cast metal or molded plastic, which may have to be machined only with respect to the threads on the inlet conduit 62a and the outlet conduit 64 and in similar minor areas. This produces a substantial saving in comparison with the cost when the casing 35 has to be completely machined.

As shown in FIGURE 1, the lower cover member 38 of the casing 35 supports a gasket element 45 to form a seal between the upper part 36 of the casing 35 and the cover member 38. The gasket element 45 bears against the lower portion of the resilient blocks 50, 52, 54, and 56 to urge them into engagement with shoulder means 47 on the inside of the upper portion 36 of the casing 35.

It should be understood that the foregoing manner of mounting the fluid metering device may readily be employed to mount the device within a recess, which might be formed in a machine tool frame, for example. Thus, the mounting arrangement permits ready installation of the fluid metering device of the present invention in the environment in which it is to be used.

As shown in FIGURES 1 and 5, the rotor shell 51 may have recesses 52a formed in its top and bottom walls to reduce the area of engagement of the rotor shell 51 with the top wall 16 and the bottom wall 18 of the irregular cylinder 10. This allows the rotor shell 51 to turn freely within the irregular cylinder 10 when it is actuated by fluid flowing through the measuring device.

The rotor shell 51 is preferably formed of a lower cup-like part 55 and a top plate 57, which is secured to the part 55 by screws 59 (see FIGURE 6). The part 55 forms the side wall and the bottom wall of the rotor shell 51 while the plate 57 forms the top wall of the rotor shell 51.

The complete vanes 60 of the rotor assembly 51a are pivotally supported on pins 62, which are preferably disposed within the side wall of the rotor shell 51. Each of the complete vanes 60 extends through a slot or opening 65 in the side wall of the rotor shell 51.

Figures 10, 11, 12, 13:
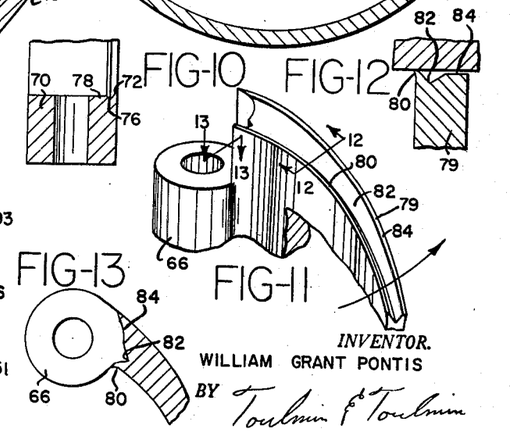
FIGURE 10 is a fragmentary sectional view indicated by line 10—10 on FIGURE 9, showing a detail in connection with the sealing arrangement of FIGURE 9.
FIGURE 11 is a perspective view showing a portion of one of the vanes illustrating the manner in which the edges of each of the vanes engaging the top and bottom walls of the irregular cylinder are formed to provide for a seal therebetween.
FIGURE 12 is a sectional view, indicated by line 12—12 on FIGURE 11, showing the seal along one of the edges of the vane.
FIGURE 13 is a sectional view, indicated by line 13—13 on FIGURE 11, showing the manner in which the inner edges of the vane above and below the hub portion thereof are sealed to the vane rotor.

As shown in FIGURES 1, 3 and 11, each of the complete vanes 60 has a hub 66. Each of the hubs 66 is adapted to be disposed within one of the openings 65 in the side wall of the rotor shell 51. The hubs 66 are generally cylindrical in shape and the edges of the walls, which form the openings 65, are correspondingly shaped.

Figure 9:
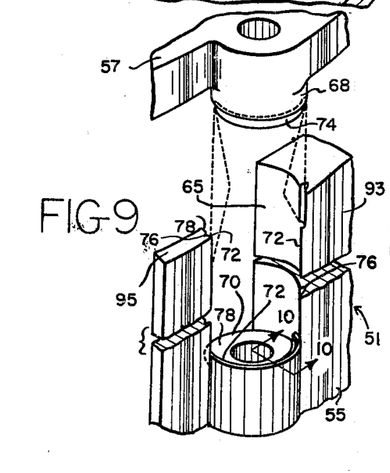
FIGURE 9 is a perspective view showing the portion of the rotor in which the vane hub is disposed and illustrating the manner of providing a seal about the hub including the ends of the hub.

The top plate 57 as shown in FIGURES 1 and 9 of the rotor shell 51 has depending portions 68, as shown in FIGURE 9, which are preferably formed integral within the upper plate 57, extending downwardly between portions of the side wall of the rotor shell 51 into the upper end of each of the openings 65. The depending portion 68 engages an upper end of the hub 66 of the complete vane 60 (see FIGURES 9, 11 and 13). The lower end of each of the hubs 66 of the complete vanes 60 are engaged by a top surface of upstanding lugs 70, FIG- URES 9 and 10, which extend from the bottom wall 55 of the rotor shell 51 into each of the openings 65.

In order to prevent fluid leakage between the complete vane 60 and its corresponding opening 65, a seal is employed. The seal includes a small V-shaped lip 72, which extends down the opposite portions of the side wall of the rotor shell 51 forming the opening 65 of the outer surfaces of the side wall of the rotor shell 51 and around the outer edges of the lug 70. See also FIGURE 8.

The depending portion 68 of the rotor shell 51 has a lip 74, which corresponds with the lip 72, formed on its outer edge. A turbulence groove 76 is formed inwardly of the lip 72. Inwardly of the turbulence groove 76, there is a region 78 having a small clearance with the surface of the adjacent hub 66 (see FIGURES 9 and 10). In this manner, the hub 66 of each of the complete vanes 60 is sealed entirely about its periphery where it passes through the side wall of the rotor shell 51 so that fluid leakage through the opening 65 is prevented.

As shown in FIGURES 9, 10, 11, 12, and 13 a similar sealing arrangement is employed along the top and bottom edges of each of the complete vanes 60 and along the inner edge of the measuring portion 79 of each of the complete vanes and below the hub 66. See FIGURE 8. The FIGURES 11 and 12 show a measuring vane 79 having a seal lip, a V-turbulence groove 82 and a clearance land region 84 for use for a higher order of sealing. This sealing arrangement includes a V-shaped sealing lip 80 on the pressure side of the measuring vane 79 followed by a turbulence groove 82 and then an area of close clearance 84. This effectively seals along the top and bottom edges of the measuring vane 79 where they engage the top wall 16 and the bottom wall 18 of the irregular cylinder 10. It also seals between the inner edge of the measuring portion 79 of the vane above and below the hub 66 (see FIGURE 10) where the measuring vane fits against the side wall of the rotor shell 51 above and below the opening 65 in the side wall of the rotor shell 51.

It should be understood that the sealing arrangement described above and shown in FIGURES 9, 10, 11, 12 and 13 does not apply to the edge of measuring vane which is in sealing engagement with the side wall of the measuring chamber side wall of the cylinder. However, if desired, the sealing arrangement of FIGURES 11 to 13 could be utilized on the outer edge of each of the measuring vanes.

In FIGURE 3 each of the complete vanes 60 has an inner portion 86 disposed within the interior of the rotor shell 51 and preferably formed integral with the outer portion and the hub 66. It should be understood that the parts of the complete vane 60 could be separate and secured together by suitable means. The inner portion 86 of the complete vane 60 is considered an actuating portion since it moves the measuring portion 14 from its retracted position to its extended position and cooperates with a stationarily positioned actuator 88 to insure that the outer edge of the measuring vane 14 remains in sealing engagement with the inner side wall of the irregular cylinder 10 when the measuring vane 14 passes through the measuring chamber 21.

The actuator 88 is fixedly mounted on the shaft 30 and precisely angularly oriented with respect to the inlet port 20 and the outlet port 22 by a key 90. The configuration of the stationarily positioned actuator 88 insures that the outer edge of the measuring vane 14 is in sealing engagement with the inner side wall of the irregular cylinder 10 when the measuring vane passes through the measuring chamber.

The fluid which initially fills the enclosed rotor is isolated from the fluid which is thereafter measured.

THE VANE-EXTENSION COUNTER-FLOW SYSTEM

Because of its peripheral configuration, the actuator 88 cooperates with the inner wall of the rotor assembly 51a and the inner portion 86 of the vane 60 to cause the fluid within the interior of the rotor assembly 51a to flow in a direction opposite to the direction of rotation of the rotor assembly 51a. This opposite direction of the flow of fluid is indicated by the arrow 98 in FIGURE 3.

Figures 30, 31, 32, 33, 34:
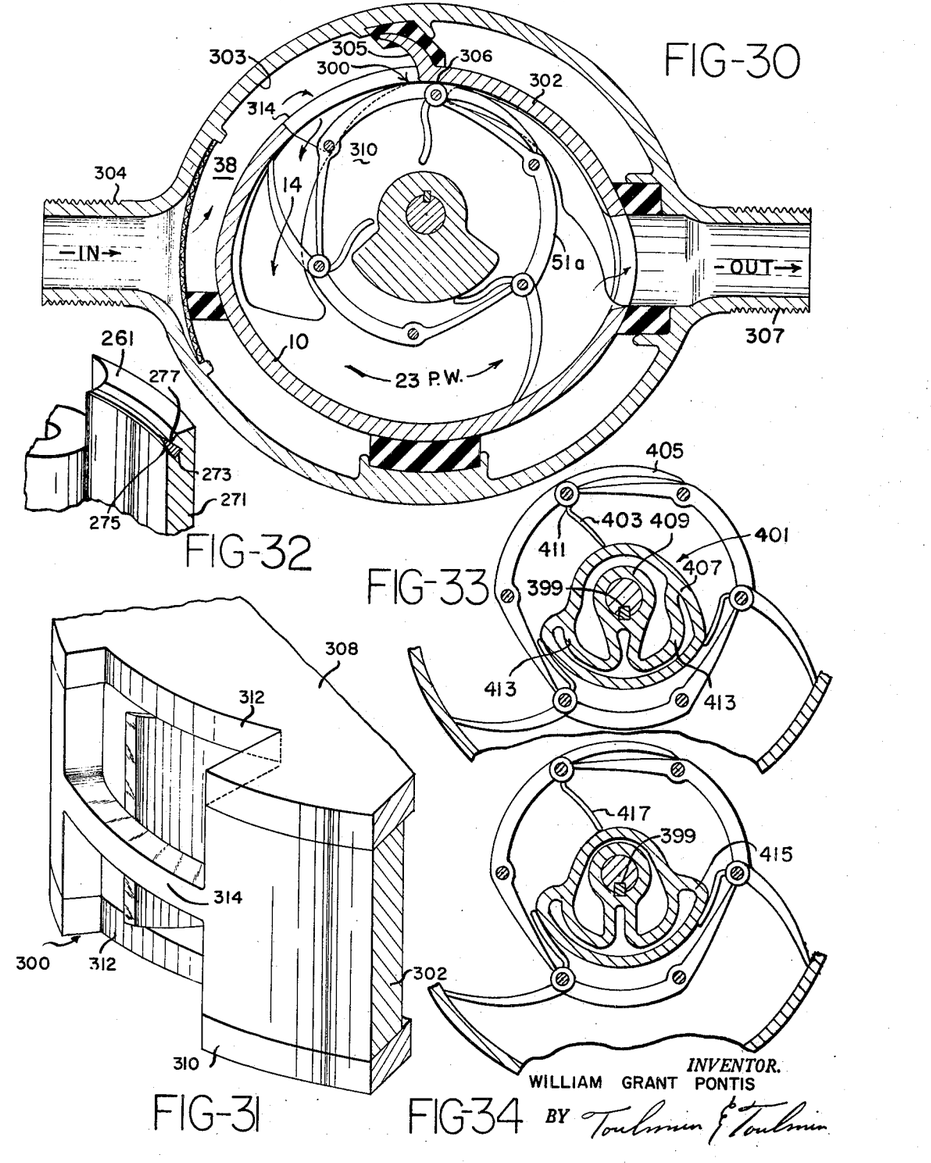
FIGURE 30 is a plan sectional view through a modified arrangement of a fluid measuring device according to the present invention showing the inflow passage greatly extended clockwise to direct the fluid around and behind the extending vane.
FIGURE 31 is a perspective view showing the formation of the inlet port in the irregular cylinder of the modification of FIGURE 30.
FIGURE 32 is a fragmentary view showing still another type of inserted seal element, similar to the seal elements of FIGURES 28 and 29.
FIGURE 33 is a fragmentary view showing an actuator member similar in configuration to the actuator member of FIGURES 14 and 15 except that the actuator member of FIGURE 33 is resilient both radially and rotationally. This actuator may be used for gas.
FIGURE 34 is a view, similar to FIGURE 33, showing an actuator which is resilient radially and rotationally and may be used for liquid.

Thus, as is shown in FIGURES 3, 30 and 31, the measuring vane 14, having passed the zero torque seal line, is moved by the counter-flow action 98 against the inner vane 86 causing the outer vane 14 to extend outward; thereafter, the inflowing fluid, FIGURES 30 and 31, cooperates to further extend the vane 14 to sealingly engage the inside cylinder wall 10, at the beginning of the measuring chamber. Therefore the actuator 88 only has to maintain the outer edge of the measuring vane 14 in sealing engagement with the inner side wall of the irregular cylinder 10 as it passes through the measuring chamber. It should be understood that the volume of the zone or cavity of the counter-movement of the fluid diminishes as the vane inner portion 86 rotationally advances.

The counter-flow system of vane extension as illustrated in FIGURES 3 and 30 and described above has likely application to fluid devices other than meters.

THE RETRACTED VANE CAVITY SYSTEM

As shown in FIGURE 3, the exterior side wall of the rotor shell 51 is formed by a plurality of cylindrical portions 93, which are interconnected by portions 95, which are recessed or notched inwardly from the circular periphery of the portions 93. The portions 95 are recessed inwardly to permit the vane 60 to be moved about the pivot pin 62 into a position where the measuring vane 14 forms a continuation of the cylindrical portions 93. When the measuring vane 14 is in its fully retracted position, its periphery has the same radius as the periphery of the cylindrical portions 93.

When the measuring vane 14 is in its maximum retracted position, a fluid cavity 97 is formed between the inner surface of the measuring vane 14 and the outer surface of the adjacent portion 95. This fluid cavity is shown in FIGURE 3 adjacent to the zero torque seal line 92 on the irregular cylinder 10.

The seal line 92 is located at the maximum retraction of the measuring vane 14 and will be referred to as the "zero torque seal line." The portion of the side wall of the irregular cylinder 10 having the seal line 92 is arranged eccentric with respect to the axis of rotation of the rotor assembly 51a. This is necessary to insure that all of the fluid flows through the measuring chamber and is discharged through the outlet port 22. This eccentric portion of the irregular cylinder 10 is disposed opposite the measuring chamber and results in the irregular shape of the cylinder 10. This eccentric portion of the cylinder 10 also cooperates with the measuring vanes 14 in their retraction and extension.

Since the measuring vane 14 has the same radius as the cylindrical portion 93 of the rotor shell 51 when the measuring vane 14 is in its maximum retracted position, the zero torque seal line 92 of the irregular cylinder 10 is continuously in sealing engagement with the rotor 51 through contact with either the periphery of the cylindrical portion 93 or with the outer face or periphery of the measuring vane 14. Thus, the outlet port 22 is sealed from the inlet port 20 except through the measuring chamber.

In order to permit maximum extension and maximum retraction of each of the measuring vanes 14 during rotation of the rotor assembly 51a and still measure all of the fluid entering the measuring chamber, a fluid flow system is provided within the irregular cylinder 10. This system includes measuring vane retraction relief passage 94 (see FIGURE 3), which are formed in the top wall 16 and the bottom wall 18 of the irregular cylinder 10 between the outlet port 22 and a point before the zero torque seal line 92. The system also includes measuring vane extension relief passages 96 (see FIGURE 3), which are formed in the top wall 16 and the bottom wall 18 of the irregular cylinder 10 between the inlet port 20 and a point short of the zero torque seal line 92.

As the measuring vane 14 begins to pass the forward edge of the outlet port 22, the actuator portion 86 of the vane 60 ceases contact with the stationarily positioned actuator 88. As the measuring vane 14 starts to retract toward the depressed portion 95 of the rotor shell 51, the fluid therebetween would be compressed. However, because the recesses 94 function as passages from the space between the measuring vane 14 and the adjacent portion 95, the fluid is able to return to the outlet region toward outflow part 22. This permits the measuring vane 14 to be moved to its fully retracted position by the interior of the eccentric portion of the side wall of the cylinder 10. The measuring vane 14 reaches its maximum retracted position to form the fluid cavity when the pivot pin 62 of the measuring vane 14 rotates to the zero torque seal line 92.

Thus, by the time that the measuring vane 14 is in its fully or maximum retracted position in which the fluid cavity 97 is formed between depressed portion 95 and retracted measuring vane 14 the fluid will have escaped through the recesses 94 except for the amount remaining in the cavity.

As the retracted vane 14 rotates past the zero torque seal line, fluid in the cavity transfers from outflow zone passage 94 to inflow passage 96. The liquid cavity plus the sealing action of the retracted vane 14 combines to provide a fully effective seal between the inflowing fluid and the outgoing fluid. This minor but uniform and permanently established and controlled and transferred cavity volume of fluid is taken into account in the design of the transmission and the registry of the fluid so as to record only the actual fluid volume which is passed through the outlet 64.

This means, explained above, of retracting moving vanes from one pressure side of a fluid system to another pressure side of the same system, herein illustrated in FIGURE 3 at the zero torque seal line, has likely application to fluid devices other than meters.

The entire space inside of the casing 35 and throughout the fluid measuring device, which comprises the cylinder 10 and the rotor assembly 51a is about the same pressure. This is accomplished by flooding the entire interior of the casing 35 and the inside of the hollow rotor shell 51 with the fluid.

Because of the balance of pressure prevailing inside and outside of the rotor assembly 51a, the fluid within the rotor assembly 51a is isolated from the fluid actually being measured as it enters the inlet port 20 of the cylinder 10 and exits through the outlet port 22 of the cylinder 10. The filling of the interior of the casing 35 and the rotor assembly 51a occurs when the measuring device of the present invention is first connected to the conduit having the fluid, which is to be measured, flowing therethrough.

As shown in FIGURES 1 and 3, a screen 100 is mounted on the interior of the casing 35 between the exit of the inlet conduit 62a of the casing 35 and the inlet port 22. The accurate length of the screen 100 is sufficient to permit the fluid, which enters through the inlet conduit 62a, to pass into all of the space in the casing 35 around the entire fluid measuring device.

The bottom wall 18 of the irregular cylinder 10 has an annular dependent flange 102 (see FIGURE 1) abutting a top edge of an annular filter element 104, which has its bottom edge engaged by the resillient gasket member 45. The space inside of the filter 104 communicates with the interior of the rotor assembly 51a by a passage 106 so that the interior of the rotor assembly 51a is filled with the fluid.

It should be understood that passageway 106 could be eliminated. In this arrangement, fluid would be added to the interior of the rotor before the parts are secured to each other.

Additionally, the passage 106 could be utilized to fill the interior of the rotor and then sealed as a final assembly step. It will be readily understood that whether the passage 106 is used, sealed or eliminated, that the rotor is self-enclosed since there is no actual sealing of the rotor by any of the walls of the cylinder.

An annular filter element 108 is disposed on the top of the irregular cylinder 10 and extends into engagement with the upper portion 36 of the casing 35. Thus, fluid passes through the screen 100 and into the space between the irregular cylinder 10 and the casing 35 and then flows through the annular filter 108 to flood all space about the fluid measuring device. This space, which is around the fluid measuring device, is preferably provided with a vent 109. The vent 109 may be readily opened to relieve trapped air and then closed after the space is completely filled with fluid.

It also should be observed that the fluid, which enters the conduit 62a, also passes through the inlet port 20 into the interior of the irregular cylinder 10 to completely fill it with fluid. Thus, leakage is substantially inhibited because the fluid pressure differential across any joint where leakage might take place is maintained extremely low. Since the rotor assembly 51a turns freely in the irregular cylinder 10, only a small differential pressure is required between the inlet port 20 and the outlet port 22 to cause rotation of the rotor assembly 51a.

Since the rotation of the rotor assembly 51a is a predetermined function of the rate of fluid flow through the measuring device depending on the size of the measuring chamber 21, the amount of rotation of the rotor assembly 51a indicates the amount of fluid flow. In order to properly calibrate the fluid flow, it is necessary to transmit the rotation of the rotor assembly 51a to an indicating register or the like.

The rotor assembly 51a has an upstanding shaft portion 111, which extends upwardly through an opening in the top wall 16 of the irregular cylinder 10.

This shaft 111 connects with any transmission and registering device.

A pinion or sun gear 120 is mounted on the upper end of the shaft 111 for meshing with a planet gear 122. The planet gear 122 meshes with teeth on the inside of a ring gear 124, which is formed in the upper side of the top wall 16 of the irregular cylinder 10.

As shown in FIGURE 1, the three gears 120, 122, and 124 are positioned in the same horizontal plane. An annular plate 126, which is attached to the upper edge of the ring gear portion of the irregular cylinder 10, retains the planet gear 122 in position on top of the irregular cylinder 10.

The planet gear 122 has a disc 128 rotatably mounted thereon and coaxial therewith. The outer edge of the disc 128 cooperates with a rod 130, which extends through an aperture 132 in the top wall of the upper part of the casing 35. The rod 130 is sealed as it passes through the top wall of the casing 35 by a rubber-like diaphragm 134. The edge of the disc 128 actually bears against the diaphragm 134 to cause nutation of the rod 130.

Thus, as the planet gear 122 rolls around the inside of the ring gear 124 due to rotation of the rotor 51 causing turning of the gear 120, the rod element 130 will nutate. This movement is employed to drive an input shaft 136 of a register mechanism to indicate the amount of fluid flow through the measuring device. The register mechanism may be mounted within an upstanding cylindrical part 138 of the casing 35.

The register drive, which comprises the gearing arrangement, the disc 128 and the rod 130, imposes very little load on the fluid measuring device while obtaining a large speed reduction, which is necessary for operating a conventional register mechanism. Accordingly, the expensive and elaborate gear trains normally employed to reduce the speed of the meter are eliminated. This also eliminates the accompanying power loss.

The rod 130 also includes a cup-like thrust element 131, which bear against a dependent lip surrounding the aperture 132 in the top wall of the upper part 36 of the casing 35. This arrangement locates the rod 130 axially as well as providing for a low frictional support thereof.

As shown in FIGURE 1, the inner portion of the vanes 86 and the stationarily positioned actuator 88 are slightly less in height than the vertical space within the asembled rotor shell 51a. Notwithstanding this, the actuator 86 is sensitive to the counter-revolving fluid inside the assembled rotor 51a when the fluid is a liquid.

When the fluid being measured is a gas, it may be preferable to extend the inner vane 86 and the stationarily positioned actuator 88 to occupy the entire distance between the top and bottom walls of the assembled rotor shell 51, so that all related components are in near-sealed relation to each other.

Figure 14:
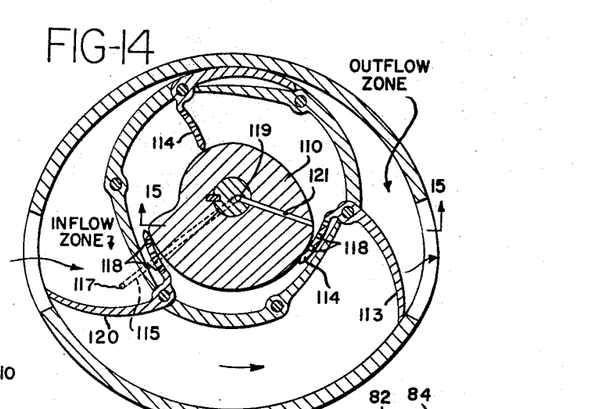
FIGURE 14 is a plan sectional view taken through the rotor and the irregular cylinder of the fluid measuring device and illustrating a modified arrangement for actuating the vanes.
Figure 15:
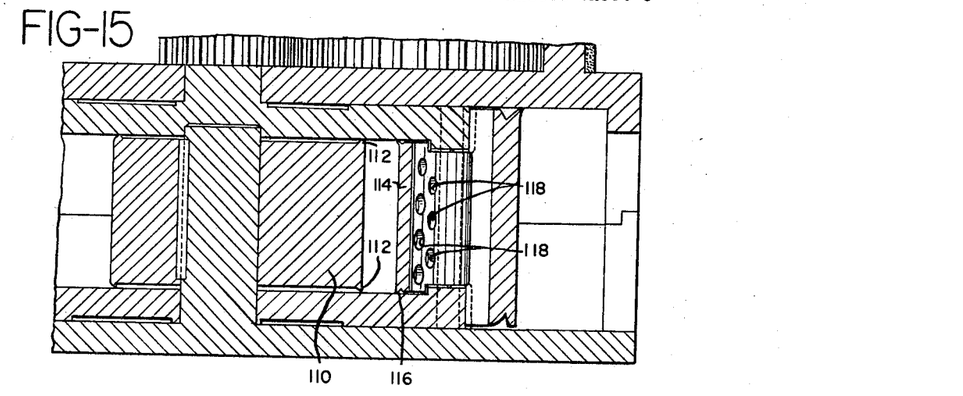
FIGURE 15 is a vertical sectional view, indicated by line 15—15 on FIGURE 14, showing the FIGURE 14 arrangement but also illustrating manners of reducing the area of the rubbing contacts between portions of the fluid metering device and also illustrating the seals in the metering device at various locations.

Accordingly, as shown in FIGURES 14 and 15, a stationarily positioned actuator 110 extends the entire height of the inside of the rotor shell 51 and is sealed thereto at the bottom and top walls by sealing lips 112. Each inner vane 114 also extends completely from the top wall of the rotor shell 51 to the bottom wall of the rotor shell and is sealed therewith by sealing lips 116.

As required for gas, the actuator inner vane 114 of FIGURE 14, may have one or more apertures 118 extending therethrough to provide restricted passages through which the counter-rotating fluid within the rotor assembly 51a can pass to develop a pressure on the leading sides of the inner vanes 114, to cause the outer vanes 120 to swing outwardly to their extended positions.

The actuator 110 is shaped on its periphery so as to remain in near-sealing engagement with the inner ends of the actuator inner vane 114 throughout entire rotation. This arrangement increases the effect of the counter-rotating fluid on the inner vanes 114 to produce the required action on the outer vanes 120.

If the fluid metering device of the present invention is inserted in a cavity provided therefor in a machine tool or the like, for example, it is desired to have the fluid metering device as a complete unit so that no external connection is required other than the connections to the inlet and outlet ports. Accordingly, an arrangement must be provided for filling the interior of the rotor assembly 51a with fluid from inside of the fluid metering device.

Referring to FIGURE 14, there is shown an arrangement for supplying the interior of the rotor assembly 51a with fluid from inside the fluid metering device instead of externally thereof. This includes a passage 115 in the cylinder 10 having its inlet port 117 located in the inflow zone of the metering device. The passage 115 has its outlet port connecting with a bore 119 in the shaft on which the stationarily positioned actuator 110 is mounted. A second passage 121 leads from the bore 119 to the interior of the rotor shell 51 at a region, which is normally under minutely lower pressure because of the movement of the fluid within the rotor assembly 51a due to the pumping action generated by relative rotation of the inner actuator vane and the actuator 110. This arrangement insures that the rotor assembly 51a will always be maintained with fluid.

While the foregoing modifications have employed three vanes on the rotor, it should be understood that two or more vanes could be employed on the rotor.

In the foregoing modifications, the stationarily positioned actuator 110 is a solid member, however, the stationarily positioned actuator may have a certain amount of resiliency therein. FIGURE 15 is a vertical section view of FIGURE 14.

Figures 16, 17, 18, 19, 20, 21, 22, 28, 29:
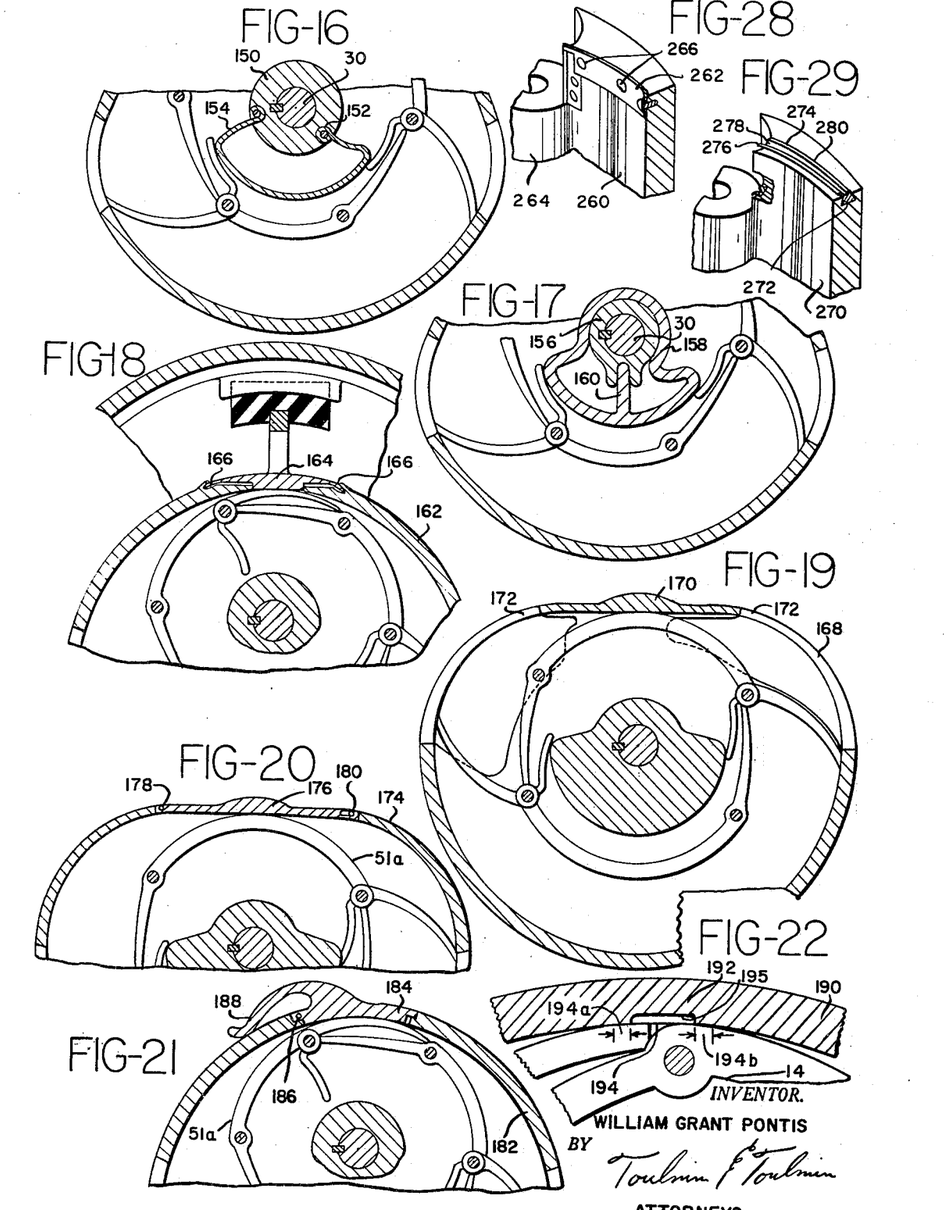
FIGURE 16 is a fragmentary plan sectional view, similar to FIGURE 14, but showing a different type of vane actuator.
FIGURE 17 is a plan sectional view, similar to FIGURE 16, showing another type of vane actuator.
FIGURE 18 is a fragmentary plan sectional view showing the provision in the irregular cylinder wall of a resilient element sealing the irregular cylinder wall to the rotor between the two chambers for incoming and outgoing fluid.
FIGURE 19 is a plan sectional view showing another manner of providing resiliency in the wall of the irregular cylinder between the inlet and outlet chambers.
FIGURE 20 is a plan sectional view showing still another manner of providing for resiliency in the irregular cylinder wall.
FIGURE 21 is a plan sectional view showing another resilient portion in the irregular cylinder wall.
FIGURE 22 is a fragmentary plan sectional view illustrating how a substantial arc of contact could be established between the rotor and irregular cylinder wall for more effective sealing between the inlet and outlet chambers.
FIGURE 28 is a sectional view through a vane showing a sealing element attached to the vane rather than being formed integral therewith.
FIGURE 29 is a view, similar to FIGURE 28, showing how the vane could be provided with a recess or the like along its edge to receive a preshaped sealing element.

Accordingly, one type of actuator with some resilience is shown in FIGURE 16 wherein a cylindrical element 150 is keyed to the shaft 30. The element 150 has cylindrical grooves extending axially along its periphery to receive cylindrically formed end portions 152 of an actuator 154. The actuator 154 is in the form of a resilient strip of material such as a plastic or metal, for example.

The cylindrical end portions 152 are retained within the grooves in the cylindrical element 150 because of the resiliency of the material.

FIGURE 17 shows a piloted portion of the actuator 158 on a stationary hub 156 and capable of a small amount of rotational movement around the hub.

The strut 160 is radially rigid, but is rotationally flexible to permit some oscillating rotative movement of the entire actuator around a centering hub bearing.

As the inner vane moves around the actuator 158 toward the beginning of the measuring chamber, the actuator 158 has yielding capability, resulting in a smooth, timed engagement of the measuring vane tips at the beginning of the measuring chamber. This provides rotational resiliency only, and the actuator is radially rigid for rigid seal-engagement of the measuring vane tip with the measuring chamber cylinder wall.

Another modifications of the stationarily positioned actuator is shown in FIGURE 33 wherein the stationarily positioned actuator 401 is resilient in both radial and circumferential directions. A stationarily positioned actuator 401 is mounted on the shaft 30 and positioned thereon by a key 399. The configuration of the stationarily positioned actuator 401 is such that it remains in engagement with inwardly projecting actuator portions 403 of vanes 405 throughout rotation of the vanes 405. The actuator 401 includes an outer part 407, which near-sealingly engages the portions 403 of the vanes 405, and an inner hub part 409, which surrounds the shaft 30. The inner hub part 409 and the outer part 407 are connected together by ribs 413 which are resilient both radially and rotationally. This arrangement also permits the movement of the outer portion 407 in these directions without any substantial distortion of the outer portion 407.

Another form of the invention in which the stationarily positioned actuator is resilient in both radial and circumferential directions is disclosed in FIGURE 34. This arrangement is substantially the same as that shown in FIGURE 33 except that it has its outer portion 415 designed to engage actuator portions 417 of the vanes 405 only during the travel of the vanes 405 throughout the measuring chamber. As in the modification of FIGURE 33, the outer portion 415 is resilient in both radial and circumferential directions because of the resilient ribs 413.

It is necesary that there be an effective seal between the rotor assembly 51a and the cylinder 10 at the zero torque seal line 92. While FIGURE 3 shows an engagement between solid members, various types of resilient engagement between the irregular cylinder and the rotor assembly 51a may be provided as shown in FIGURES 18 through 22.

Referring to FIGURE 18, an irregular cylinder 162 resiliently carries a plug 164. The plug 164 is retained on the cylinder 162 by means of axially extending resilient extensions 166 on opposite sides of the plug 164 engaging notches formed along the outside of the irregular cylinder 162. The plug 164 bears with resilient pressure against the periphery of the rotor assembly 51a to form an effective seal between the inlet and outlet chambers.

In FIGURE 19, there is shown an irregular cylinder 168 having a portion 170 bearing against the periphery of the rotor assembly 51a. The portion 170 is connected with the main part of the cylinder 168 by thinned-out portions 172 of the cylinder wall. The irregular cylinder 168 is so formed that the portion 170 is drawn against the periphery of the rotor assembly 51a with a predetermined force to develop the desired sealing pressure therebetween.

As shown in FIGURE 20, an irregular cylinder 174 has an inserted resilient portion 176 set into an opening therein and attached to the cylinder 174 at 178 and 180. The inserted resilient portion 176 bears against the periphery of the rotor assembly 51a to provide a sealing engagement therebetween.

In FIGURE 21, an irregular cylinder 182 has an axial opening therein. A pressure member 184, which is pivoted at 186 to the irregular cylinder 182, is disposed within the axial opening in the cylinder 182. A spring element 188, which is preferably integral with the pressure member 184, urges the pressure member 184 into engagement with the periphery of the rotor assembly 51a to provide the desired sealing engagement.

While the foregoing arrangmeents for providing a seal at the zero torque seal line 92 are satisfactory when the fluid being metered is a liquid, it may be desirable to provide an even more effective seal when the metered fluid is a gas. Accordingly, the modification of FIGURE 22 is especially useful for sealing a gas although it could also be utilized if a liquid were being measured.

As shown in FIGURE 22, an irregular cylinder 190 has a region 192 of its wall formed with a recess 195 therein. A substantial arc of contact 194 is provided on each side of the recess 195 to engage the periphery of the rotor assembly 51a and the periphery of the retracted vane. These two arcs of contact are disposed circumferentially apart a sufficient distance to bridge across the joints at the pivoted connection of the vanes to the rotor when the vanes are in their maximum retracted positions. Thus, as shown in FIGURE 22, one of the arcs of contact is engaging the vane 194b while the other arc of contact 194a is engaging the cylindrical portion of the rotor assembly 51a to prevent any leakage past the zero torque seal line 92 even when a gas is metered. This also provides an effective seal whenever the fluid flow through the meter is relatively small.

While the recess 195 is formed in the wall of the irregular cylinder 190 to reduce frictional engagement of the cylinder 190 with the rotor assembly 51a while maintaining an effective seal over a substantial length, it should be understood that the recess 195 could be eliminated if desired. Without the recess 195, there would be an extremely long area of contact by the two projections, which form the arcs of contact.

It sometimes may be necessary to provide connections to the meter so that the inlet port and the outlet port are not diametrically opposed. Furthermore, as previously mentioned, the metering device of the present invention may be utilized with only two vanes.

Figures 23, 24, 25, 26, 27:
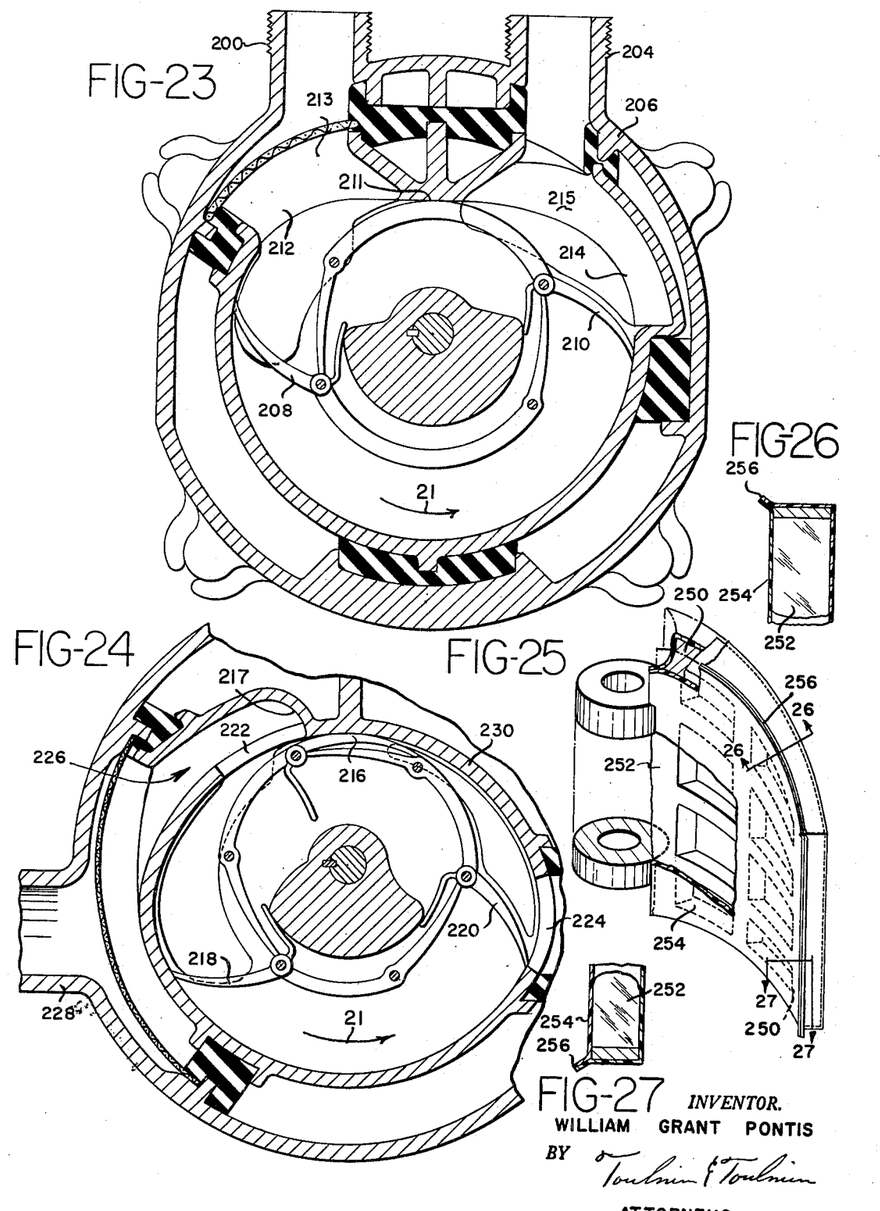
FIGURE 23 is a plan sectional view, similar to FIGURE 3, but showing a modified arrangement wherein the inlet and outlet passages from the housing for the metering device extend out the same side of the housing or casing and also showing a two vane fluid metering device.
FIGURE 24 shows a modification with an extended inflow passageway so that the incoming fluid engages the extending measuring vane shortly after the vane moves from its fully retracted position.
FIGURE 25 is a perspective view, partly in section, showing a vane constructed so that the body of the vane is in the form of a light-weight grid with a fluid impervious film covering the vane.
FIGURE 26 is a sectional view, indicated by line 26—26 on FIGURE 25, showing the manner in which the film is applied to the vane so as to have a sealing edge projecting from the vane.
FIGURE 27 is a sectional view, similar to FIGURE 26 and indicated by line 27—27 on FIGURE 25, showing how the film is applied to the vane body so as to form a seal along the top and bottom edges of the vane.

The FIGURE 23 shows the use of two vanes in a metering device having both its inlet and outlet positioned on the same side of the casing. Referring to FIGURE 23, there is shown a casing 206 of a fluid measuring device having an inlet 200 and an outlet 204 positioned on the same side of the casing 206. An inlet port 212, which communicates with the inlet 200 in the casing 206, is displaced circumferentially substantially more than 180 degrees from an outlet port 214, which communicates with the outlet 204 in the casing 206. Two identical complete vanes 208 and 210, each with an inner vane and an outer measuring vane are employed in this modification.

FIGURE 23 preferably includes tracking bridges 213 in the inlet port 212 and tracking bridges 215 in the outlet port 214. The bridges 213 and 215 are relatively thin ribs sitting edgewise to the ports so as to not interfere with the passage of fluid through the particular port while engaging the tips of the measuring vane portion of vanes 208 and 210 passing across the ports to prevent the measuring vanes 208 and 210 from overextending into the ports 212 and 214. The bridges also guide the measuring vanes toward the zero torque seal line 211, which they are next to engage, of the irregular cylinder.

FIGURE 24 discloses an arrangement having three identical complete vanes 216, 218, and 220 with an inlet port 222 of an irregular cylinder 230 placed more than 180 degrees from an outlet port 224 of the cylinder 230. To accomplish this, the cylinder 230 is provided with passage means 226 leading from an inlet 228 in the housing around the cylinder to the inlet port 222. The inflowing fluid is directed through passageway 226 to an inward rolling baffle 217 where the inflowing fluid turns inward through port 222 and around the tip of the measuring vane to the backside of the extending vane. This fluid force is applied shortly after the measuring vane moves past the zero torque seal line, and effects complete vane extension at the beginning of and throughout the measuring chamber.

While the vanes have been described as solid members in the previous modifications, a lighter construction of the vanes may be employed as shown in FIGURES 25–27. While only the outer portion of the vane is disclosed in FIGURES 25–27, it should be understood that the actuator or inner portion of the vane also could be formed in the same manner.

As shown in FIGURE 25, the vane included an outer rim part 250 having a grid-like arrangement of interconnecting bars or frame portions 252 extending therebetween. This grid-like structure is covered by a relatively thin film 254, which may be of plastic material or light weight metal material, for example, depending on its requirements. The film 254 is preferably applied in the form of pre-shaped strips, which can be cemented together as at 256 to form a sealing lip portion about the pressure side of the vane.

This construction is much lighter than a solid vane construction. While this construction is particularly useful in connection with the metering of gases where lightness of the vanes would be of importance for response to the counter-flow forces within the rotor acting on the actuator portion of the vane, the construction also may be used with liquids.

The grid-like structure, particularly for very large flow meters, could be made of metal with the balance of the grid being hollow in order to further lighten the structure.

FIGURES 28 and 29 show modifications of the vanes wherein the vanes are constructed to have a substantial clearance with respect to the top and bottom walls of the irregular cylinder. Added sealing elements are attached to at least the top and bottom edges of the vanes in a manner similar to that in which weatherstripping is attached to doors.

Referring to FIGURE 28, there is shown a vane 260 having a strip 262 attached adjacent its top edge. A similar arrangement is formed adjacent the bottom edge of the vane 260. The strip 262 may extend along the inner edge of the vane 260 above and below a hub portion 264 of the vane 260. The strip 262 may extend along the outer edge of the vane 260 where it engages the cylinder wall if desired.

The strip 262 may be a flexible resilient elastomer, such as synthetic rubber or the like, for example, or the strip 262 could be a flexible plastic material. While the strip 262 is shown attached to the vane 260 by headed pins or studs 266, it may be cemented to the vane 260.

Referring to FIGURE 29, a vane 270 has groove means 272 in at least the top and bottom edges thereof with the groove means 272 being shown in the top edge of the vane. A resilient seal element 274 is disposed in each of the groove means 272 so as to have a V-shaped sealing lip 276 at the pressure side of the vane 270. A turbulence groove 278 is formed in the seal element 274 behind the lip 276 and is followed by a region 280 of small clearance with respect to the adjacent wall of the cylinder.

The sealing element 274 could extend completely about the vane 270 from the top of the vane hub to the bottom of the vane hub or it could be utilized only along the top and bottom edges of the vane 270. The grooves means 272 is preferably of dovetail configuration for retaining the seal element 274 in position, however, the seal element 274 could be cemented in position if desired.

A similar seal arrangement is illustrated in FIGURE 32 wherein a vane 271 has a dovetail groove 273 for receiving a resilient sealing strip 275. The vane 271 has a relief region 277 behind the sealing strip 275 to provide for a turbulence chamber arrangement as has previously been discussed. Clearance 261 avoids friction.

In FIGURE 30, an inlet port 300 in an irregular cylinder 302 is located a substantial clockwise (as viewed in FIGURE 30) distance from a fluid inlet conduit 304 of the housing containing the fluid measuring device. This arrangement results in fluid being admitted into the irregular cylinder 302 underneath and behind the vane immediately after the measuring vane passes the zero torque seal line 306. The inlet port 300 is detailed in FIGURE 31.

The supply of fluid to the back of the extending measuring vane is further increased by notching out the top wall 308 and the bottom wall 310, as indicated at 312 in FIGURE 31, so that fluid can flow directly to the backside of the measuring vanes as they leave the zero torque seal line 306.

Referring to FIGURE 31, it is noted that the top wall 308 and the bottom wall 310 of the cylinder 302 are formed by plates, which extend completely to the periphery of the cylinder 302.

In order to prevent the vanes from extending into the inlet port 300, a bridge 314 (see FIGURES 30 and 31), is employed to span the inlet port 300 to function as a limiting means for preventing the vanes from over-extending outwardly into the inlet port 300.

If the bridge 314, were not utilized, the vanes could easily move into the inlet port 300. Therefore the bridge prevents over-extension of the measuring vanes.

In FIGURES 35 through 40 various means of calibration are shown to meet highly specialized conditions. One example might be when the meter is to be employed in connection with the handling of certain chemicals or drugs where an extremely high degree of precision is needed.

These new devices are illustrated in FIGURES 35 through 40. Basically, the arrangements include means for changing the size of the measuring chamber within the cylinder by moving the cylinder wall inwardly or outwardly relative to the rotor. The small amount of movement necessary to produce the desired changes in volume of the measuring chamber will not interfere with the operation of the fluid meter because of the resilience of the stationarily positioned flexible actuator.

Figures 35, 36, 37, 38, 39, 40:
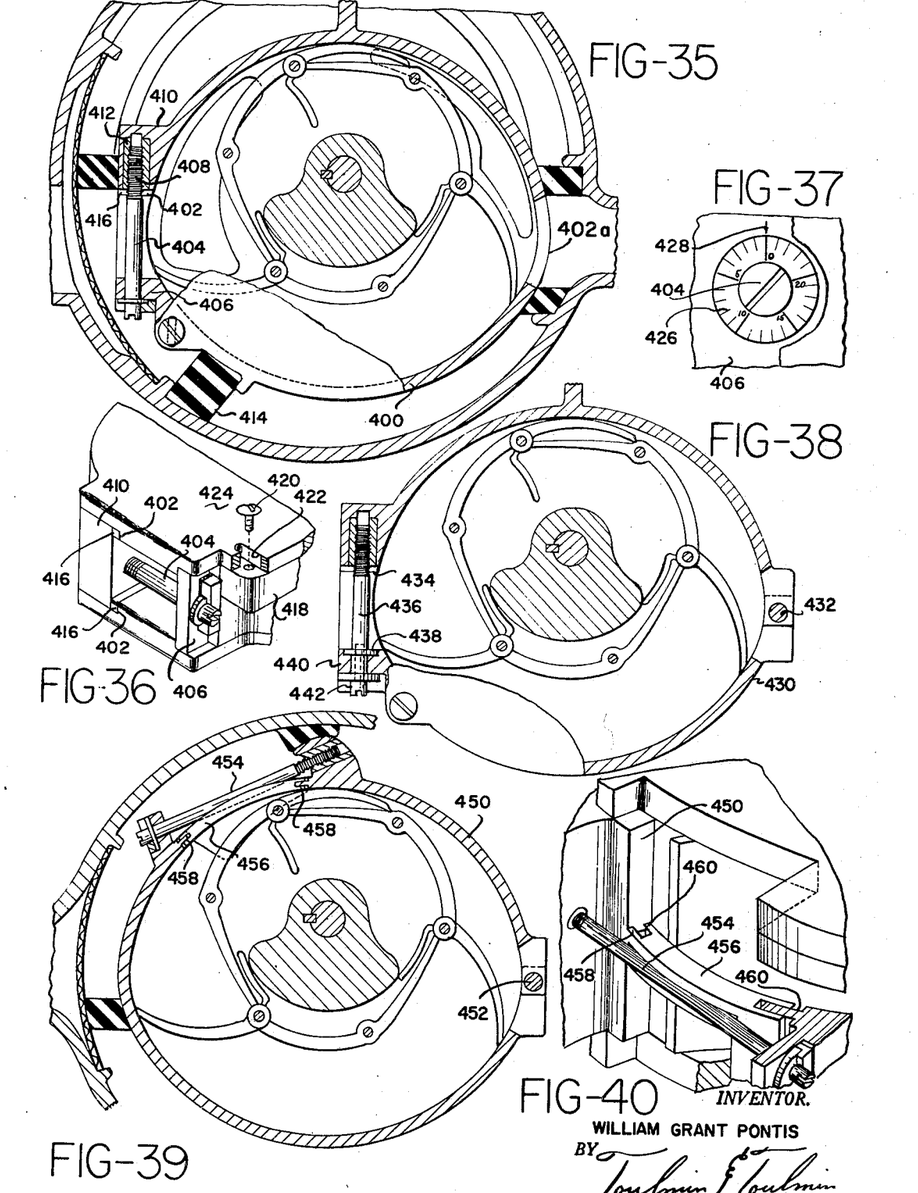
FIGURE 35 is a plan sectional view showing a meter structure including an arrangement for calibrating the meter.
FIGURE 36 is a perspective view showing details of construction of the calibrating arrangement of FIGURE 35.
FIGURE 37 is a fragmentary view showing an adjusting screw forming a part of the calibrating arrangement.
FIGURE 38 is a plan sectional view showing a modified construction wherein the irregular cylinder of the meter is made in two parts.
FIGURE 39 is a fragmentary plan sectional view showing a modified construction in which the irregular cylinder of the meter is formed in two parts with a tracking bridge inserted in one of the ports of the irregular cylinder.
FIGURE 40 is a fragmentary perspective view showing the construction of the tracking bridge of the FIGURE 39 modification.

As shown in FIGURES 35 and 36, an irregular cylinder 400 has a split 402, which is disposed in the inlet port of the irregular cylinder 400 although it could be disposed in the outlet port if desired. A calibrating screw 404 has one end rotatively mounted in a projecting lug 406 on the cylinder 400 at one side of the inlet port while the other end of the screw 404 has threads 408 for cooperation with a lug 410, which is disposed on the cylinder 400 at the other side of the inlet port. If desired, the lug 400 may have a metallic insert 412 therein. By adjustment of the screw 404, the cylinder 400 can be caused to enlarge or diminish slightly. This either adds or subtracts from the size of the measuring chamber to change the volumetric capacity of the fluid mechanism per revolution. A flexible hinge 402a is provided in the cylinder opposite to the calibrating portion of the cylinder.

A resilient block 414, which functions in the same manner as the resilient blocks 50, 52, 54, and 56 in FIGURE 3, to position the irregular cylinder 400 within the casing, is sufficiently resilient to permit adjusting movement of the wall of the irregular cylinder 400. The head of the screw 404 is confined in the lug 406 against axial movement therein so that both the opening and closing movements of the cylinder 400 are positively controlled.

If desired, spacer members or shims 416 (see FIGURE 36) could be disposed in the split 402 after the calibration of a given group of cylinders has been determined. In this manner, the screw 404 could be drawn up tight to lock the cylinder 400 in its adjusted position.

A further locking arrangement is illustrated in FIGURE 36 wherein a screw lug 418 is formed on the cylinder 400 to receive a lock screw 420, which passes through a slot 422 in top wall 424 of the cylinder 400. It should be understood that the slot 422 could be formed in the bottom wall, rather than the top wall 424, of the cylinder 400 if desired.

If desired, the screw 404 may be provided with graduation means 426 (see FIGURE 37). The graduation means 426 cooperates with a stationary index mark 428 on the lug 406 of the cylinder 400 so that the adjusted position of the screw 404 can be readily determined.

Referring to FIGURE 38, there is shown another embodiment in which a cylinder 430 is formed in two parts pivoted together by a pin 432. The pin 432 is preferably disposed in the region of the outlet port of the cylinder 430.

At the other side of the irregular cylinder 430, namely, the inlet port, the two parts of the cylinder 430 are separated as indicated at 434. A calibrating screw 436 extends between the two pivoted parts and interconnects their ends together.

In this FIGURE 38, the calibrating screw 436 has a flange 438 on its head end for engaging one side of a lug 440, which is formed on the irregular cylinder 430. A shoulder screw 442 is threaded into the outer end of the calibrating screw 436 to connect the calibrating screw 436 with the lug 440 to prevent axial movement therein while permitting rotation of the calibrating screw 436.

In FIGURES 39 and 40, there is shown an irregular cylinder 450, which is formed of two parts pivoted together by a pin 452 in the area of the outlet port of the irregular cylinder 450. Calibrating screw means 454 extend between the ends of the pivoted parts of the irregular cylinder 450 at its inlet port.

A tracking bridge 456 extends across the inlet port to guide the measuring vanes across the inlet port and prevent over-extension into the inlet port. The bridge 456 has slotted ends 458, which slideably fit over projections 460 formed in the ends of the two pivoted parts of the cylinder 450. This slotted arrangement permits ready adjustment of the parts of the cylinder 450 for the purpose of calibrating the meter.

The structure of the present invention has long life because wear has been reduced to a minimum and means are provided for isolating the critical portions of the measuring device from the influence of any foreign particles that might be carried in the stream of fluid passing through the metering device.

The inlet screen will screen out particles longer than a predetermined size and the annular filters in the top and bottom of the fluid measuring device will prevent particles of any size greater than, say, five microns from entering the hollow rotor or from entering the space in which the transmission leading from the measuring device to the register is located.

Particles that might pass through the inlet screen and enter the inside of cylinder 10 can pass directly therethrough to the outlet port and, even in the remote possibility of such a particle getting under the outer edge of one of the vanes, there is little likelihood of damage of any sort because the vanes are resiliently maintained in sealing relation by the flexible actuator.

It will be understood that while modifications have been illustrated utilizing two vanes and three vanes, the number of vanes could vary from two upwardly and would not necessarily be limited to three.

Thus, the fluid measuring device of the present invention is characterized by a high degree of accuracy, reduced expense over the cost of metering devices according to the prior art, and greater range of capacity of the fluid measuring device of any overall size.

The measuring device of the present invention is extremely sensitive to minute pressure differentials and liquid flow in which conventional fluid measuring devices are normally inaccurate.

By completely flooding the chamber in which the fluid measuring device is disposed with fluid and also flooding the interior of the hollow rotor, leakage in the measuring device is materially inhibited and is reduced to an absolute minimum. This is because the various designs provide for a total substantial pressure balance in all regions openly connected, and having functionally sealed separations.

For purposes of exemplification, particular embodiments of the invention have been shown and described according to the best present understanding thereof. However, it will be apparent that changes and modifications in the arrangements and construction of the parts thereof may be resorted to without departing from the spirit and scope of the invention.

What is claimed is:

1. In combination:
   (a) a cylinder having an upper portion and a lower portion, and having an inlet port and an outlet port to allow flow of liquid through said cylinder;
   (b) a self-enclosed hollow rotor rotatably mounted within said cylinder and cooperating therewith to form a flow passageway between said inlet port and said outlet port, a portion of said flow passageway forming a measuring chamber;
   (c) at least two vanes pivotally mounted on said rotor, each of said vanes having a first portion disposed within said rotor and a second portion disposed outside said rotor, said rotor and said vanes together comprising a rotating structure, said rotating structure being in sealing engagement with a portion of the side wall of said cylinder approximately opposite said measuring chamber to form a liquid seal at least one point;
   (d) means for filling said hollow rotor with a substantially isolated liquid;
   (e) actuator means disposed within said rotor, said actuator means cooperating with the interior of said hollow rotor to cause said substantially isolated liquid to move said second portion of said vane to its maximum extended position prior to entry of said second portion of said vane into said measuring chamber, a portion of said actuator means being configured to maintain said second portion of said vane in sealing engagement with said cylinder during movement of said second portion of said vane through said measuring chamber by flow of fluid through said flow passageway; and
   (f) means to pivot said second portion of said vane to its maximum retracted position after it leaves said measuring chamber.

2. The device according to claim 1 wherein means are provided for adjusting the diameter of said measuring chamber portion, means to maintain said adjustment and means to calibrate said adjustment and show the amount of adjustment.

3. The device according to claim 1 in which the side wall of said cylinder has an open gap whereby the volume of said measuring chamber portion may be adjusted and means to adjust the volume of said measuring chamber portion by moving the ends of the side wall of said cylinder toward and away from each other, said open gap being disposed in one of said ports of said cylinder.

4. The device according to claim 1 in which the side wall of said cylinder is formed of at least two parts movably coupled to each other, one of said parts including the side wall of said cylinder which forms one of the walls of said measuring chamber portion, and means to adjust said parts with respect to each other to adjust the volume of said measuring chamber portion.

5. The device according to claim 4 including means to control the extension of each of said vanes as it traverses said inlet port.

6. The combination of claim 1 in which said rotor has the exterior of its side walls formed to define totally enclosed liquid cavities between said exterior of its side walls and said second portion of said vanes when said second portion of said vanes are in said maximum retracted position.

7. The combination according to claim 1 wherein a portion of the wall of said cylinder is resiliently biased into said sealing engagement with said rotary structure to form said liquid seal at at least one point.

8. The combination according to claim 1 in which said actuator means is stationarily positioned, said stationarily positioned actuator means being rigid in a radial direction and flexible in a rotational direction.

9. The device according to claim 1 in which at least a portion of said vanes comprise a grid-like structure and a film covering said grid-like structure.

10. The device according to claim 1 in which said actuator means, said first portion of said vane and said interior of said rotor define a diminishing zone within said rotor containing a portion of said substantially isolated liquid, said liquid portion exerting force upon said first actuator portion of each of said vanes within said rotor to cause said first portion to retract and to extend said second portion of the same vane.

11. The combination of claim 1 in which said cylinder includes a liquid passageway within at least one of said upper or lower portion of said cylinder in the vicinity of said inlet port for movement of liquid from the frontal outside face of the extending second portion of each of said vanes to a space between the trailing side of said second vane portion and the outside wall of said rotor.

12. The combination of claim 1 in which said cylinder includes a liquid passageway within at least one of said upper or lower portions of said cylinder in the vicinity of said outlet port for liquid movement of liquid from between the trailing face of said second portion of said vane and the outside wall of said rotor to a liquid space between the leading face of said vane and said outlet port of said cylinder.

13. The combination of claim 1 in which said cylinder has a cylinder head, a fixed support on said cylinder head, said rotor being mounted for rotation about said fixed support, said actuator being mounted on said fixed support within said rotor.

14. The combination of claim 1 including transmission means drivingly connected with said rotor for transmitting the number of turns of said rotor to a register means, in which said transmission means comprises a sun gear driven by said rotor, a planet gear driven by said sun gear, a stationary ring gear within which the said planet gear meshes and rotates, a disc rotatably mounted on said planet gear, a rod drivingly engaging said disc at one end thereof and said register means at the other end thereof.

15. In combination:
   (a) a cylinder having an inlet port and an outlet port to allow flow of liquid therethrough;
   (b) a rotating structure within said cylinder and cooperating therewith to form a flow passageway from said inlet port to said outlet port, said flow passageway having a uniform measuring chamber portion, said rotating structure being in sealing engagement with a portion of said cylinder; said rotating structure including:
      (i) a hollow rotor mounted for rotation about a fixed axis;
      (ii) a plurality of vanes pivotally mounted on said rotor, each said vane including a first portion inside said rotor and a second portion outside said rotor;

(c) means for filling the interior of said rotor with a substantially isolated liquid; and
(d) actuator means within said rotor, said actuator means cooperating with the interior of said rotor and said first portion of each said vane to define a diminishing chamber whereby said substantially isolated liquid within said rotor is effective to bias said first portion of each said vane thereby to move said second portion of each said vane to the extended position prior to entry of said second portion into said substantially uniform measuring chamber portion of said flow passageway.

References Cited

UNITED STATES PATENTS

| | | | |
|---|---|---|---|
| 1,294,760 | 2/1919 | Bowser | 91—148 |
| 600,173 | 3/1898 | Robarts | 91—142 |
| 148,994 | 3/1874 | Swann et al. | 91—142 |
| 116,362 | 6/1871 | Slaughter | 91—145 |

FOREIGN PATENTS 7,907  10/1905  Denmark.

JAMES J. GILL, Primary Examiner

J. W. WHALEN, Assistant Examiner